March 31, 1970  A. R. SCHMOYER ET AL  3,503,296
VISUAL KEYBOARD TEACHING DEVICE
Filed July 18, 1967  5 Sheets-Sheet 1

INVENTORS
ARTHUR R. SCHMOYER,
JAMES J. DOZIER, JR.,
RICHARD H. BRADFORD
JOHN E. E. BOSWELL, JR.
BY
ATTORNEYS

March 31, 1970  A. R. SCHMOYER ET AL  3,503,296
VISUAL KEYBOARD TEACHING DEVICE
Filed July 18, 1967  5 Sheets-Sheet 5

INVENTORS
ARTHUR R. SCHMOYER
JAMES J. DOZIER, JR.
RICHARD H. BRADFORD
JOHN E. E. BOSWELL, JR.

BY
Smith, Michael, Bradford & Gardiner
ATTORNEYS

United States Patent Office 3,503,296
Patented Mar. 31, 1970

3,503,296
VISUAL KEYBOARD TEACHING DEVICE
Arthur R. Schmoyer, Potomac, James J. Dozier, Jr., Glen Echo, and Richard H. Bradford, Kensington, Md., and John E. E. Boswell, Jr., Falls Church, Va., assignors, by direct and mesne assignments, to Electro Learner Corporation, Wilmington, Del., a corporation of Delaware
Continuation-in-part of application Ser. No. 623,168, Feb. 2, 1967, which is a continuation-in-part of application Ser. No. 602,607, Dec. 19, 1966. This application July 18, 1967, Ser. No. 654,189
Int. Cl. G09b 15/02
U.S. Cl. 84—478                10 Claims

ABSTRACT OF THE DISCLOSURE

A keyboard teaching device including light indicators visually associated with individual keys and activated by manual depression of, touch contact with, or proximity to a selected key by a finger of the student to indicate the companion keys to be depressed together with the initially activated key in order to form a chord triad. Specific circuitry involves a diode matrix and associated activating, enabling, and inhibit circuits.

RELATED APPLICATIONS

This application is a continuation-in-part of application Ser. No. 623,168 for Visual Keyboard Teaching Device, filed Feb. 2, 1967, by the same inventors, which application in turn is a continuation-in-part of application Ser. No. 602,607 for Visual Chord Keyboard Teaching Device, filed Dec. 19, 1966 by Arthur R. Schmoyer, James J. Dozier, Jr., and Richard H. Bradford, and now abandoned.

The subject matter is generally similar to application Ser. No. 557,280 filed June 13, 1966 by Arthur R. Schmoyer for Visual Chord Teaching Device, now Patent No. 3,335,630, issued Aug. 1, 1967.

SUMMARY OF THE INVENTION

This invention relates generally to a visual keyboard teaching device susceptible of use with any keyboard where plural keys of a predetermined group herein referred to as companion keys, must be struck simultaneously, and specifically relates to a device for use with the keyboard of an organ or similar musical instrument. The invention provides a visual indication of the companion manual and clavial keys to be associated to sound a chord triad and accompanying bass note, this indication being activated by the initial manual selection of a key corresponding to the root note by which the chord is designated. The activation of the indicators is accomplished in various embodiments by mechanical switches activated simultaneously with depression of the root key, touch plates activated in advance of actual depression of the key by mere contact of the finger with the key surface, or by proximity of the finger to the key surface, and this activation functions through specific circuitry including a diode matrix and associated activating, enabling, and inhibiting circuits.

BACKGROUND OF INVENTION—PRIOR ART

As set forth in the aforelisted copending applications, attempts to avoid the laborious efforts inherent in generally accepted music teaching techniques have developed teaching aids utilizing light indicators to display to the student the appropriate key or keys to be depressed. Basic among these devices are those involving a record media which produces light indications of the proper sequence of melody keys to be depressed in order to play a prerecorded melody, such as disclosed in U.S. Patent 1,733,477 issued Oct. 29, 1929 to E. S. Votey, and in U.S. Patent 3,069,959 issued Dec. 25, 1962 to J. Foufonnis et al. Further improvements in the aforementioned type of teaching devices are the subject matter of copending applications, Ser. Nos. 362,360 now Patent No. 3,353,435 issued Nov. 21, 1967 and 424,998 now Patent No. 3,377,716 issued Apr. 16, 1968 filed Apr. 24, 1964 and Jan. 12, 1965 respectively. In U.S. Patent 2,820,391 issued Jan. 21, 1958 to Webster E. Janssen, there is disclosed a piano teaching device which includes indicating lights associated with the bass portion of a manual piano keyboard, and circuits responsive to the depression of a key on the treble portion of the keyboard and effective to illuminate lights indicative of an appropriate chord to be played with the melody note activated by the depressed key.

In the aforelisted copending U.S. Patent No. 3,335,630 there is disclosed a visual chord teaching device in which an indication of the appropriate keys to be depressed is provided by indicators visually associated with the appropriate keys and activated by the bass pedal appropriate to the desired chord. As set forth in the aforementioned application, the student's thought process of associating the bass note pedal and the three chord note keys is expedited by providing the student with an indication of the appropriate triad of manual keys to be depressed, which indication is presented to the student simultaneously with the depression of the pedal key.

ENVIRONMENT OF THE INVENTION

While the aforedescribed teaching device is effective to the end that it expedites the student's process of locating the triad keys, it is sometimes desirable to have the student find the key locations without first depressing the bass pedal, and to find the key corresponding to the note by which the chord is known without depending upon a visual guide. The invention herein described stems from a realization of this need, and provides a visual chord keyboard teaching device which enables a student to read from conventionally written music a chord to be played, select the key corresponding to the note by which the chord is designated (known as the root note in the case of a fundamental chord) and have presented to him a visual display indicative of the other notes or keys which make up the triad, and the appropriate bass note. The key corresponding to the note by which the chord is designated or characterized is referred to herein as the selected key, while the keys corresponding to the remaining notes making up the chord (including the clavial key, if used) are referred to as companion keys. By this device, the student must first locate the root note and physically select the corresponding key by associating his playing finger with that key before the teaching aid comes into play, thus excessive reliance on the teaching aid as a "crutch" is avoided.

OBJECTS OF INVENTION

In addition to the aforesaid instructional advantage, this invention has among its objects:
(1) The provision of a teaching device which challenges a student to physically locate a designated key but assists him in his subsequent location of companion keys to be activated simultaneously with the designated key,
(2) The provision of a teaching device which permits the use of conventionally written sheet music in the instructional process,
(3) The provision of a teaching device particularly adapted to a sustained note instrument such as an organ,
(4) The provision of a teaching device which is simple in construction and thus can be economically produced,

3

(5) The provision of a keyboard teaching device particularly adapted to instruction in the playing of both major and minor chords on a sustained note instrument, (6) The provision of a keyboard teaching device which provides a student with visual instructional indications in advance manipulation of a key, and (7) The provision of a keyboard teaching device which provides a student with a visual instructional indication and with a visual error signal in event of erroneous key manipulation.

DESCRIPTION OF DRAWINGS

These and other self-evident advantages and objects of the invention will be better understood by a consideration of the ensuing specification and the accompanying drawings which illustrate preferred embodiments of the invention, and in which.

Figure 1:
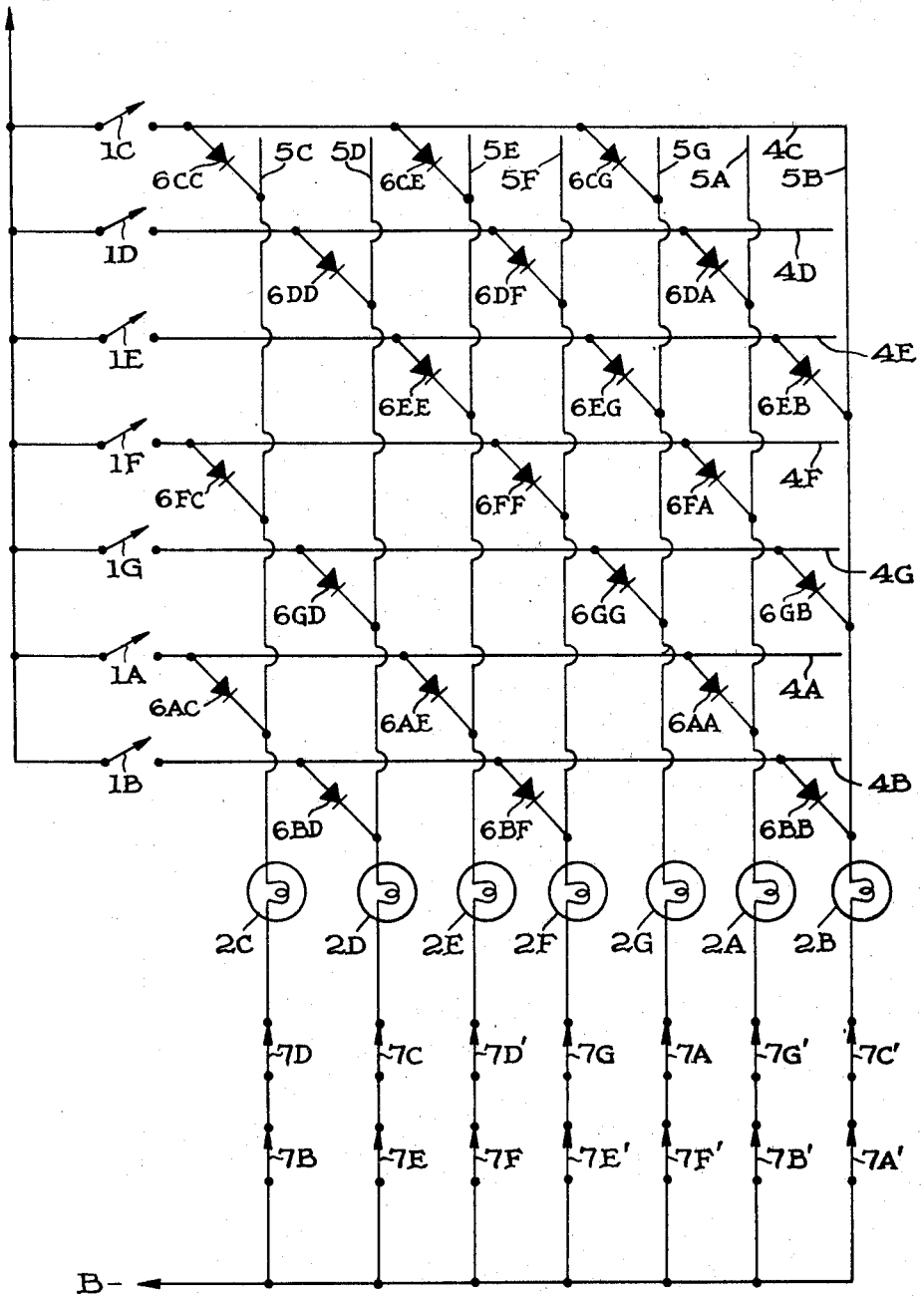
FIGURE 1 is a schematic diagram of one embodiment of the invention using electro-mechanical activation.

Referring to the drawings, and particularly to FIGURE 1, the schematic diagram discloses a plurality of activate switches 1C, 1D, 1E, 1F, 1G, 1A, 1B, each of which is associated with and activated by depression of a selected key corresponding to a note indicated by the reference letter of the switch. In the embodiment disclosed, seven switches are used with seven indicators to provide for the seven notes of one octave. Obviously, additional octaves could be included by the appropriate addition of duplicate switches, indicators, and associated circuitry.

In visual association with individual keys of a keyboard is an indicator, in this case a lamp indicated by the reference numeral 2 followed by a designation of the note appropriate to the key with which the indicator is associated. This visual association may be accomplished by locating the lamp directly above or to the rear of its associated key, providing the lamp with appropriate indicia, or by placing the lamp under or in the key to illuminate the key itself.

Interconnection of an activate switch 1 with the appropriate indicator lights 2 is established through a first circuit network including a diode matrix comprising an activate line 4 associated with each activate switch 1 and an indicator line 5 associated with each indicator 2. Such matrixes are well known in the electronics field (see, for instance, U.S. Patent 3,166,856 issued Jan. 26, 1965 to W. R. Uttal) and comprise one series of parallel lines and a second series of parallel lines crossing the first but free of any direct electrically conductive connection. Thus, the series of activate lines 4 are crossed by the series of lines 5 but are electrically isolated therefrom as far as any direct connection is concerned. Interconnection of desired pairs of activate lines 4 and indicator lines 5 is established through diodes 6 interconnecting each desired pair and oriented to pass current in the same direction in each instance. Referring again to FIGURE 1, it will be seen that activate line 4C communicates with three indicator lines, namely line 5C through diode 6CC, line 5E through diode 6CE, and line 5G through diode 6CG. Thus, closure of activate switch 1C completes a circuit from the power source to activate line 4C and, through diodes 6CC, 6CE and 6CG simultaneously activates the indicator lines 5C, 5E and 5G. The presence of similarly poled diodes at the other electrical junctions with indicator lines 5C, 5E and 5G prevents current flow through these junctions to other activate lines 4D–4B and thus avoids "sneak circuit" activation of undesired indicators through said first circuit network.

While the circuit thus far described is effective to activate the indicators for the companion keys of a desired chord triad upon depression of the selected root key, it is essential that the subsequent depression of the remaining keys for the companion notes of the triad does not result in the activation of additional indicators associated with undesired keys of other chords fundamental to those same companion notes. To illustrate specifically, the depression of the key C (root of the chord C) is effective in the aforedescribed manner to activate the indicators 2C, 2E, and 2G as is desired. The student is then expected to follow the instructions of the indication and depress keys E and G to sound the remaining companion notes and thus complete the chord. This, of course, results in closure of switches 1E and 1G. Closure of switch 1E in turn results in the energization of activate line 4E, and consequent completion of a circuit to indicator lines 5E and 5G, an immaterial consequence, as these lines have been previously energized. However, activation of line 4E also functions through diode 6EB, to energize line 5B, which would ordinarily provide an undesired activation of indicator 2B. Similarly, through switch 1G, line 4G would complete a circuit to indicate lines 5D, 5G and 5B. While line 5G is already energized, the energization of lines 5D and 5B is again undesirable, as the respective indications do not relate to companion notes desired for the chord of C.

In order to prevent the aforementioned activation of undesired indicators by the depression of keys corresponding to the indications established by activation of the initially selected key, there is provided a second circuit network including a pair of inhibit switches 7, 7' operatively associated with and activated by each of the keys 1. In the drawings, these switch contacts are schematically indicated in the electrical circuit controlled by the particular contact set, it being understood that the mechanical activation is by the key corresponding to the note designated by the letter suffix to the reference numeral. The key C, then, has mechanically associated with it the normally open activate switch 1C and the two normally closed inhibit switches 7C and 7C'. It can be seen in FIGURE 1, that inhibit switch 7C is effective to open, and thus disabled the circuit from indicator 2D upon depression of key C. Similarly, inhibit switch 7C' is effective to open, and thus disable the circuit from indicator 2B upon depression of key C. Thus, the undesired activation of indicators 2D and 2B which might be expected upon depression of keys E and G in playing the chord C (notes C E G) is prevented by the action of inhibit switches 7C and 7C' in opening the circuits to indicators 2D and 2B simultaneously with the activation of indicators 2C, 2E and 2G. In each case, the inhibited indicators correspond to the notes which appear in the musical scale on each side of the note by which the chord being played is identified. For example, the inhibit switches activated to open position by depression of the key for C are effective to disable the circuits to the indicators for B and D, and the inhibit switches activated by the key D disable indicators C and E, etc.

The aforedescribed embodiment of FIGURE 1 comprises a 7 x 7 matrix which accommodates seven keys and seven indicators. While this embodiment is adequate for basic instruction, the inventive concept is susceptible of more sophisticated implementation, limited only by considerations of expense and complexity of the teaching process. To illustrate, reference is made to the embodiments of FIGURES 3 and 4, wherein the basic circuitry of FIGURE 1 is expanded to include provision for the chords Ab, Bb, and Eb through the use of a 9 x 12 diode matrix, and in the embodiment of FIGURE 4, further expanded to include provision for additional indicators which are placed in visual association with the pedal keys of the clavial keyboard.

Referring first to the feature providing for the chords including major and minor notes, a comparison of FIGURE 3 with FIGURE 1 will reveal that the addition of minor keys and minor key indicators to the teaching device has necessitated a redistribution of the inhibit switches and the provision of supplementary normally open switches, hereinafter referred to as defeat switches, to shunt certain of the inhibit switches in the case of some chords. It will be noted that the number of inhibit switches associated with each key varies, but each key has at least one inhibit switch associated therewith. Similarly, the number of inhibit switches associated with each indicator circuit varies, but each circuit has at least one switch associated therewith.

The circuit of FIGURE 3 will be described as it is activated in playing the chord A♭, it being readily evident how other chords function in the same manner while using somewhat different switch combinations. The chord of A♭ requires an indication in visual association with the keys A♭, C and E♭. Thus, activation of the key 41 A♭ is effective through the first circuit network, specifically through activate line 42 and diodes 43, 44 and 45, to energize indicator lines 46, 47 and 48 leading to indicators 49, 50 and 51 associated with the keys A♭, C and E♭ respectively. Thus, it is indicated to the student that the keys C and E♭ should be depressed together with the key A♭ which is already depressed. As in the aforedescribed operation of the embodiment of FIGURE 1, a second circuit network is effective to inhibit unwanted indications. Thus, depression of the key E♭, closes switch 52, energizes activate line 53 and, through diodes 54, 55 and 56 energizes indicator lines 57, 58 and 48. Indicator line 48 and its associated lamp 51 for the key E♭, is already energized and no change occurs. Line 57 comprises the activate circuit for indicator 59, which circuit is inhibited by the inhibit switch 60 which has been opened by the previous depression of the key for the note A♭. Thus, undesired energization of indicator 59 for the note G is prevented. Similarly, depression of the key C closes activate switch 61 thus energizing activate line 62 and, through diodes 63, 64 and 65 energizes indicator lines 57, 47, and 66. Lines 57 and 47 are already energized, the circuit including line 57 remaining inhibited, thus no change occurs in indicators 50 and 59. Line 66 is included in the circuit of indicator 67 for the key of E, an undesired indication, but is inhibited by inhibit switch 68 which was opened by the original depression of key 41 for the note A♭, again in the same manner as in the embodiment of FIGURE 1. The addition of the minor keys in this embodiment, however, introduces a problem in that the depression of key 61 for the note C serves to open the inhibit switch 69 in the circuit of indicator 49 for the key A♭ which, of course, should remain illuminated. In order to avoid an unwanted extinguishment of indicator 49, there is provided in this embodiment a defeat switch 70 of the normally open variety which is connected in shunt with the normally closed inhibit switch 69 and is activated by depression of the key 41 for the note A♭. Thus, while key 61 for the note C is effective through inhibit switch 69 to inhibit energization of indicator 49 in the case of other chords, such as the chord C, this inhibiting action is defeated in the case of the chord A♭ by the shunting of inhibit switch 69 by defeat switch 70.

Figure 3:
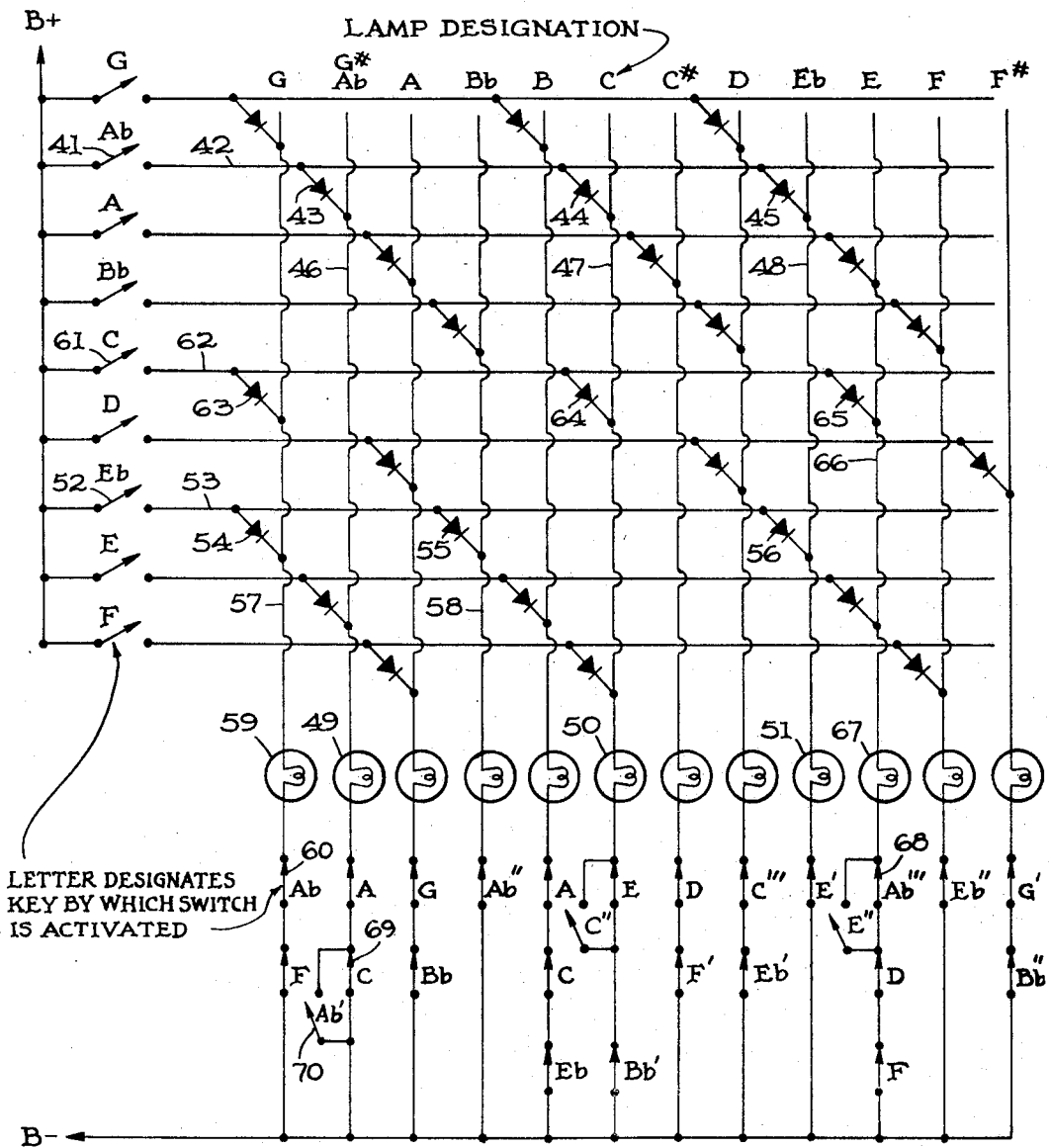
FIGURE 3 is a schematic diagram of a second embodiment of the invention including major and minor keys.

Similar situations arise by virtue of the inclusion of minor notes in this embodiment in the case of indicators 50 and 67 for the notes C and E, where similar defeat switches are provided as indicated in FIGURE 3. It should be understood that the use of this teaching device in the provision of various desired indications may require a variance of the precise association of inhibit and defeat switches with particular indicators shown and described, and that such a variance is well within the skill of the designor without departing from the basic concept of the invention. Further, it is to be understood that the drawings comprise schematic representations only, and that actual wiring may take advantage of common circuits to reduce the number of components required. Thus, in FIGURE 3 the indicators for notes A and F# are both inhibited under the same circumstance of depression of either the key for G or B and consequently may share a common inhibit circuit, as will be evident in a consideration of the embodiment of FIGURE 4, which is now to be described.

Figure 4:
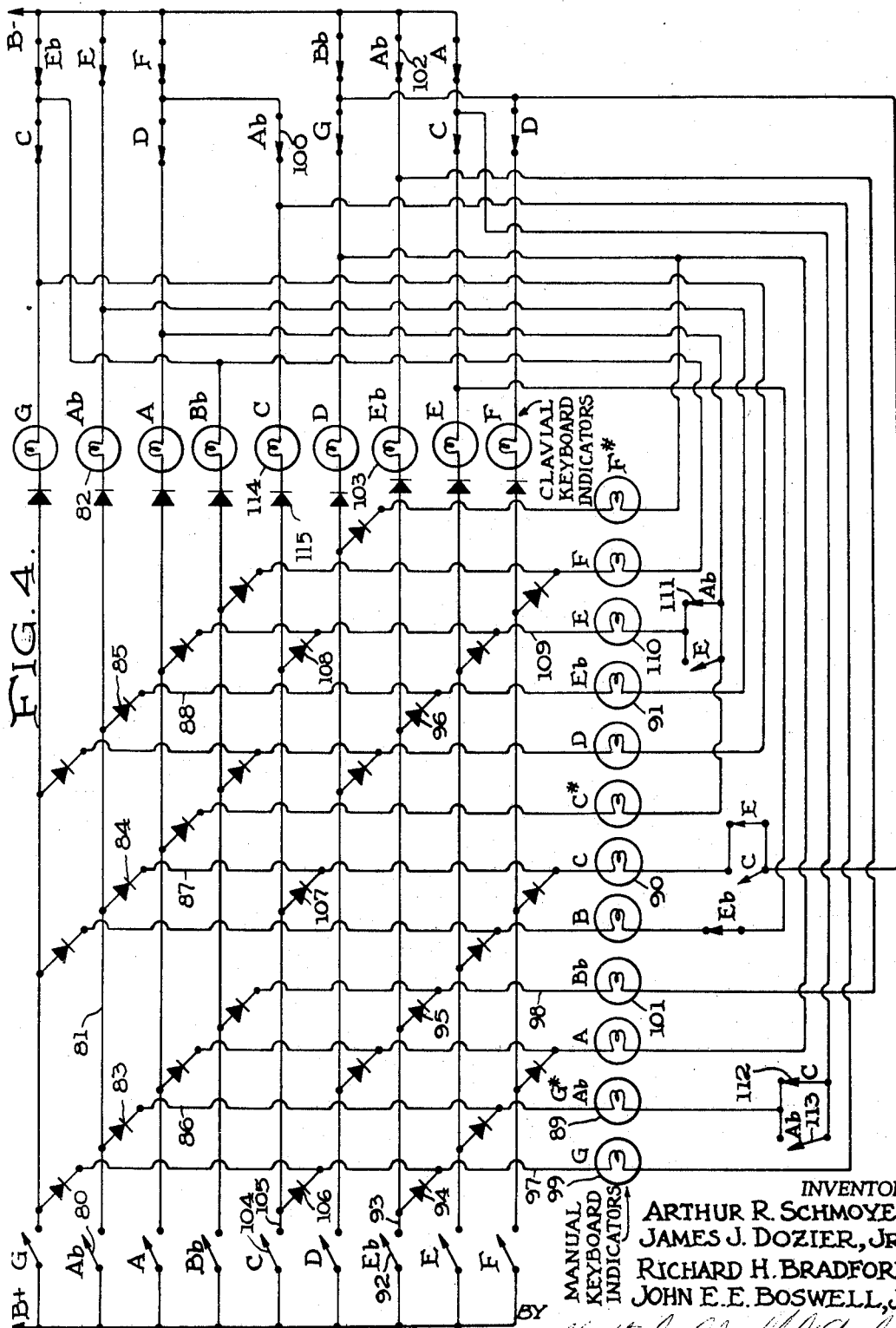
FIGURE 4 is a schematic diagram of a third embodiment of the invention including clavial key indicators.

In the sounding of chords with a substained note instrument such as the organ, it is desirable to "round out" the chord triad by superimposing a bass note appropriate to the particular chord. This bass note is sounded by the depression of a single key in the form of a foot pedal known as a "clavial" key. Thus, it becomes desirable that a teaching device include a provision for indicating to the student the proper pedal or clavial key to be depressed in playing each chord, and that this indication be presented simultaneously with the triad indication for the manual keys. To this end, the embodiment of FIGURE 4 provides a second set of indicator lights in visual association with the pedal keys of the clavial keyboard. Again, this embodiment will be described in connection with its use in playing the chord A♭, it being evident that indications for other chords are provided in the same basic manner while using somewhat different switch combinations.

As before, the chord A♭ calls for an indication in visual association with the manual keys A♭, C and E♭ and the pedal key A♭. Depression of the manual key A♭ closes activate switch 80 to energize activate line 81 thus supplying B+ to the indicator 82 associated with the A♭ pedal key and, through diodes 83, 84, and 85 to indicator lines 86, 87, and 88 and thus to the indicators 89, 90, and 91 visually associated with the keys A♭, C and E♭ respectively. The inhibit circuits to all of the aforementioned indicators, i.e. pedal A♭ and manual A♭, C, and E♭, remain closed, and consequently each of these indicators is illuminated to identify to the sudent both the manual and pedal keys which are to be depressed. Subsequent depression of the pedal key for the bass note A♭ introduces no problem in circuitry, as no activate switches are associated with the clavial keyboard. Depression of the manual keys C and E♭ completes the chord triad function in the same manner as in the embodiment of FIGURE 3 insofar as the manual keyboard indicators are concerned. Thus, depression of the key E♭ closes switch 92 energizing activate line 93 which, through diodes 94, 95 and 96 energizes indicator lines 97, 98 and 88. Indicator line 88 and its associated indicator 91 for the key E♭ is already energized and no change occurs. Line 97 comprises a portion of the energizing circuit for indicator 99, which circuit is disabled by inhibit switch 100, which was previously opened by the depression of the key for A♭. Line 98 is associated with indicator 101 for the key B♭, which in turn is disabled by inhibit switch 102, also opened by the previous depression of the key for A♭. In this embodiment, the depression of the manual key E♭ and consequent energization of activate line 93 serves further to supply B+ to indicator 103 associated with pedal key E♭ of the clavial keyboard. Illumination of indicator 103 is, of course, undesired and is prevented by previously mentioned inhibit switch 102, the inhibit circuit being common with that of indicator 101 for the manual key B♭. The simultaneous depression of the key C serves in a similar manner to close switch 104, energize activate line 105 and, through diodes 106, 107 and 108 to energize indicator lines 97, 87 and 109. Line 97 is ineffective in view of the previously described deactivation of the circuit for indicator 99 by inhibit switch 100. Line 87 and its indicator 90 for the key C is already activated through switch 80 and diode 84, and no change in the desired illuminated state of this indicator occurs. Line 109 for the indicator 110 is ineffective due to the disabling of this circuit by inhibit switch 111 opened by the previous depression of the key Ab. It is noted that the opening of inhibit switch 112 by depression of the C key is ineffective in the circuit of indicator 89 inasmuch as switch 112 has been shunted by the closure of defeat switch 113 by the previous depression of key Ab. Depression of key C and energization of the activate line 105 through closure of switch 104 supplies B+ to indicator 114 associated with pedal key C of the clavial keyboard, but is ineffective in illuminating the indicator due to the aforedescribed open inhibit switch 100 in the inhibit circuit common to indicator 99 for the manual key G.

The inclusion of inhibit switches in portions of circuits common to more than one indicator gives rise to the possibility of an unwanted partial illumination of several indicators other than those associated with the desired companion keys. This "sneak circuit" activation in which manual and clavial indicators are placed in series by the common inhibit circuits is prevented by inclusion of forwardly poled diodes in the activate circuit of each clavial keyboard indicator, as indicated at 115 in the case of the indicator for the note C.

A further refinement of the invention involves the use of electronic inhibiting means in order to eliminate the mechanical switches from the inhibit circuits of the second circuit network. In this embodiment, shown schematically in FIGURE 5, the switches are reduced to a single pole normally open contact set associated with each of the individual keys by which a chord is known. Each switch if effective through a first circuit network to activate the indicators visually associated with the selected key and each companion key of a triad in the same manner as in the aforedescribed embodiments. The inhibit function, however, is accomplished through a second circuit network deriving its inhibit function from the same switch contact set.

Figure 5:
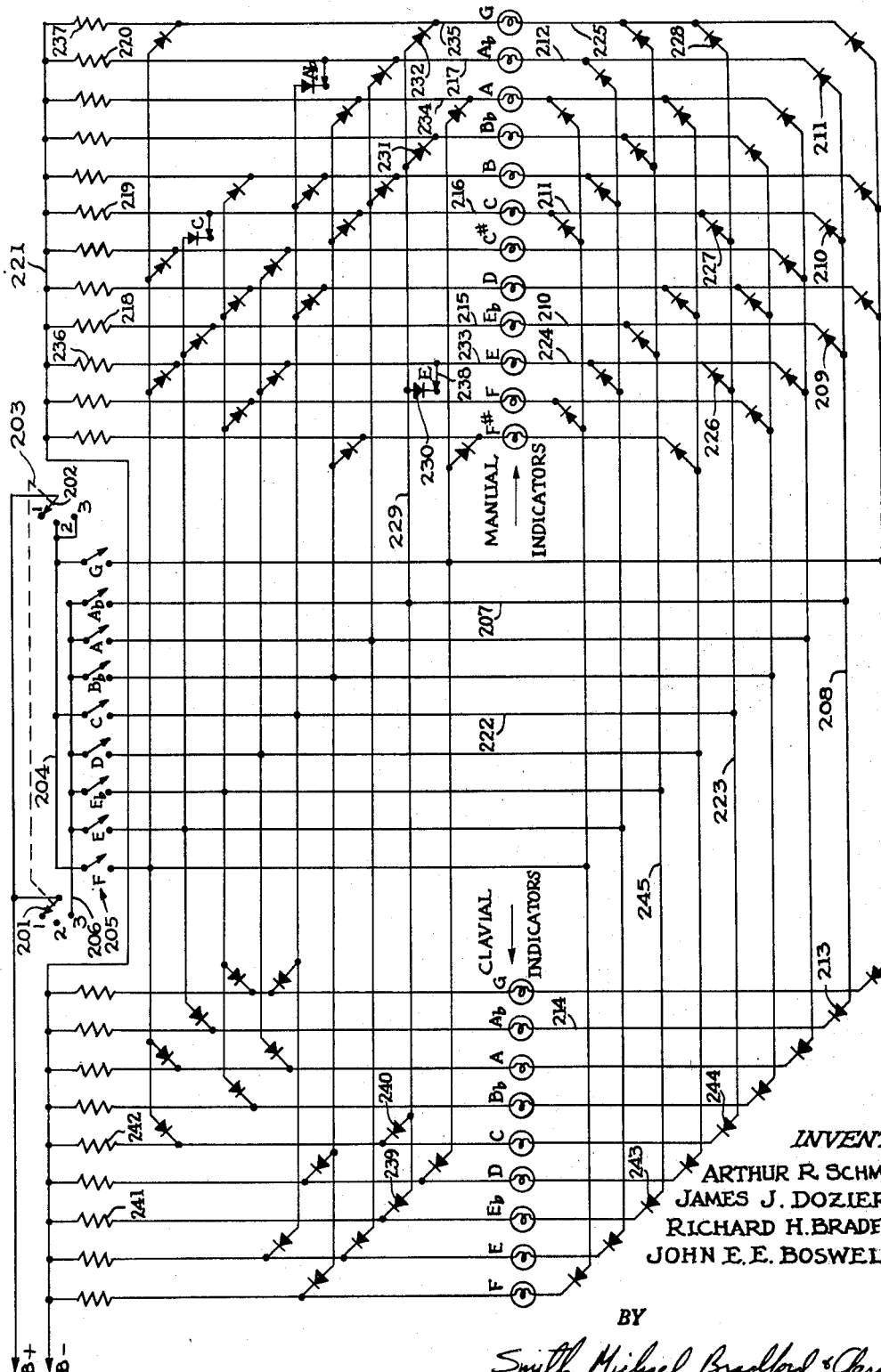
FIGURE 5 is a schematic diagram of a fourth embodiment of the invention using electronic inhibit circuits.

Specifically with reference to FIGURE 5, a positive direct current is derived from any suitable source designated as B+ and is fed to the switches associated with each key through a 3-position master switch. This switch comprises a pair of contact arms 201 and 202 ganged as indicated by the dotted line 203 for simultaneous movement by a manual control (not shown) accessible to the student. In the uppermost or "off" position (designated by No. 1) the teaching device is completely isolated from B+ and the musical instrument may be operated independently of the teaching device. In elementary stages of instruction when it is desirable to confine the operation of the teaching device to a limited number of keys, the master switch is moved to the No. 2 position, in which no contact is established by arm 201 and arm 202 connects the B+ to bus 204 which in turn is connected to the switches associated with the limited number of keys to be subject to the teaching device. In the case illustrated, B+ is thus supplied to the switches 205F, 205C, and 205G only. Movement of the master switch to the No. 3 position maintains the connection through arm 202 to bus 204 and additionally establishes a connection through arm 201 to bus 206 which in turn is connected to the remaining switches. Thus, in position 3, all of the switches are supplied with B+ and the teaching device is prepared for use in its entirety.

As in the preceding embodiments, the embodiment of FIGURE 5 will be further described in connection with its operation in playing the chord Ab, it being evident from this description how the remaining portions of the circuit function in an identical manner for instruction in the playing of other chords.

Actuation of the manual key Ab closes switch 205Ab thus energizing line 207 which in turn is connected at its lower extremity to activate line 208 comprising a portion of a first circuit network including diode matrices interconnecting the switching means 205 and the indicator lines leading to the manual and clavial indicators respectively. This entire first circuit network is normally in a quiescent or passive mode, and energization of activate line 208 serves, through diodes 209, 210 and 211 to switch indicator lines 212, 213 and 214 from the passive mode to an energized or activate mode, thus energizing the indicators for the manual keys corresponding to the notes Ab, C and Eb. The energization of line 208 also serves, through diode 213, to switch indicator line 214 from a passive mode to an activate mode, thus energizing the indicator visually associated with the clavial key Ab. The student is thus provided with indications that the manual keys Ab, C and Eb and the clavial key Ab are to be depressed.

As in the aforedescribed embodiment of this invention, the actuation of the companion keys C and Eb would activate additional unwanted indications were it not for the provision of a second circuit network which serves to inhibit such unwanted indications. In FIGURE 5 this second circuit network appears above the indicator lamps and comprises a diode matrix and a resistor bank for both manual and clavial indicators.

Following further the operation of the circuit in the playing of the chord Ab, energization of manual keyboard indicators Ab, C and Eb is completed through inhibit lines 215, 216 and 217 respectively, and through impedances with inhibit lines comprising resistors 218, 219 and 220 respectively, to the common return bus 221. In order to assure full illumination of the indicator, the rated value of the indicator bulb is chosen to be one half of the B+ voltage, and the value of the inhibit line resistors is chosen to dissipate the remaining half of the voltage under the current conditions of the particular indicator. While the particular parameters chosen may vary with the brilliance desired, a convenient formula for ascertaining these parameters is:

$$R = \frac{\frac{1}{2}B+}{I\ \text{BULB}}$$

where:

R—Inhibit line resistance in ohms
I BULB—Current through indicator

From the foregoing it is seen that the second circuit network is normally in an enabling mode whereby the aforedescribed energization of the indicators is accomplished with no change in the inhibit circuits involved. In order to prevent unwanted energization of other indicators upon activation of the companion keys C and Eb, it is necessary to switch the inhibit circuits to the indicators Bb, G, and E from the normal enabling mode to an inhibit mode. To this end, actuation of key C energizes line 222 which, at its lower extremity is connected to activate line 223 thus energizing indicator lines 224, 211, and 225 through diodes 226, 227 and 228 respectively. Indicator line 211 has been previously energized through diode 210 and simply remains illuminated. The energization of the indicators E and G through lines 224 and 225 respectively is undesired, and consequently must be inhibited. For this purpose, line 207 from the switching means 205 associated with the key Ab is connected at an intermediate point with an inhibit bus 229, thus supplying B+ through diodes 230, 231 and 232 to the inhibit lines 233, 234 and 235 for the indicators visually associated with the keys E, A and G, respectively. The indicator for A has not been energized, thus no change in circuit operation is involved. The indicators for E and G have been supplied through indicator lines 224 and 225 with B+ in the aforedescribed manner by the actuation of the key C, but the concurrent energization of inhibit lines 233 and 235 by actuation of the key Ab serves to shunt the indicator lamps E and G by channeling the B+ directly to inhibit resistors 236 and 237, where the entire B+ is dissipated in returning to the common B— bus 221.

It is evident that the concurrent actuation of the companion key Eb would normally activate indicators Bb and G, but illumination of these indicators is inhibited by a similar shunting through diodes 231 and 232.

The aforedescribed operation of the second circuit network in inhibiting the operation of unwanted indicators is further complicated by the fact that an indicator which is unwanted and thus inhibited in the playing of one chord may be essential to indicate the proper keys to be associated as companion keys in another. To provide for this complication, it is necessary to defeat the normal operation of the inhibit circuit under these conditions. To this end, in the modification of FIGURE 5 the diodes interconnecting certain inhibit bus connections with the certain inhibit lines are removed from the circuit under the aforementioned conditions by the operation of normally closed switches in series with the diode. The function is similar to that of the normally open shunt switches of FIGS. 3 and 4, but will be described in detail with respect to defeating the inhibiting operation of the indicator E by the switching means 205 for the key A♭ in FIGURE 5.

In the foregoing description of the operation of the FIGURE 5 device, it is seen that activation of the indicator E is inhibited by operation of switching means 205A♭ through line 207, inhibit bus 229, and diode 230 to inhibit line 233. While this is the desired mode of operation in the playing of the chord A♭, when it is desired to play the chord of E in the minor it is necessary to simultaneously activate indicators for the companion keys A♭, B and E. Thus, the normal inhibit operation which would preclude activation of the indicator E while the key A♭ is actuated must be detected. To this end, normally closed defeat switch 238 is opened by actuation of the key E, thus removing the interconnection through the second circuit network diode 230 and permitting normal energization of indicator E through the first circuit network.

A similar defeat switch is interposed in the inhibit circuits of the indicators for C and A♭, and in each case the defeat switch is operated by actuation of the key with which its respective indicator is visually associated.

At the same time that the aforedescribed illumination of indicators visually associated with the keys for the notes A♭, C and E♭, is taking place, it is desirable to indicate to the student that the clavial key for the bass note A♭ should be depressed. To this end, each clavial key is provided with an indicator as in the embodiment of FIGURE 4, and these indicators are connected to portions of the first circuit network for activation and to portions of the second circuit network for inhibit purposes.

Still considering the operation of the device in connection with the playing of the chord A♭, it can be seen that the aforedescribed closing of switch 205A♭ and consequent energization of line 207 and first circuit network activate line 208 serves, through diode 213 and indicator line 214 to energize the clavial indicator for the key A♭. Further, the energization of line 207 serves, through its intermediate connection to second circuit network inhibit bus 229 and diodes 239 and 240 to apply B+ to inhibit lines for the indicators E♭ and C at a point between the indicators and their respective inhibit impedances 241 and 242. Thus, these indicators are effectively shunted so that subsequent depression of the keys E♭ and C and energization through first circuit network activate lines 245 and 223 and diodes 243 and 244 is ineffective in illuminating the indicators.

The terms "inhibit" and "disable" have been used in the foregoing descriptions in order to avoid confusion with the "enabling" circuits to be described in connection with the embodiment of FIGURE 2. It will be understood, however, that the second circuit network functions when in one mode to inhibit or disable operation of an indicator, or when in a second mode to permit or enable operation of the indicator. Thus, the term "enabling switching means" as used herein may be considered generic to both embodiments.

It is generally contemplated that the teaching device of this invention would be used with an organ emitting sound during the instructional process wherein any error on the part of the student in failing to follow the indications and depressing the wrong triad of keys would be immediately evident by the resultant discord in the emitted sound. In the event that the invention is to be used with a non-musical keyboard, a mock instructional keyboard or a muted instrument (as might be the case in classroom instruction of numerous pupils) it is highly desirable that the student be provided with a visual indication of error. In this regard, the particular use of a limited number of inhibit switches provides such an indication by leaving uninhibited the indicators for notes occurring in triads having root notes adjacent to the notes of the desired chord. Thus, if a student depresses the key C, receives an indication that keys E and G are to be depressed, and erroneously depresses the key F in lieu of key G, an error indication circuit will be established which causes a change of indication from the desired triad to an indication not suggestive of a harmoniously proper triad. Specifically with reference to FIGURE 1, depression of the key F closes switch 1F to energize lines 4F and lines 5C, 5F and 5A. Indicator 2C is already activated so no change occurs therein. Indicator 2F has been disabled by the activation of switch 1E upon depression of the key E. Indicator 2A, however, is undesired but has not been disabled by the operation of any inhibit switch, and is consequently activated through switch 1F, line 4F, diode 6FA, line 5A, the indicator, and closed inhibit switches 7G′ and 7B′. At the same time, closure of switch 1F serves to open inhibit switch 7F and 7F′ in the circuits to indicators 2E, 2G and extinguish or deactivate the same. Thus, a student committing an error by striking a key other than that called for by the indicator as being the proper companion to the originally selected root key is presented with an error signal in the form of an indication which changes dramatically upon depression of the erroneous key, in this case from the C-E-G indication to a C-A indication.

In summary, the embodiments of FIGURE 1 and FIGURES 3–5 each provide a chord keyboard teaching device for association with a keyboard which comprises a series of indicators, each of which is visually associated with the selected key and with companion keys to be depressed at the same time. Upon depression of the proper keys as indicated the proper machine function is attained and no change occurs in the indication until terminated by release of the keys. Should an error be made by depressing a key other than one corresponding to the activated indicators, a change in indication provides a signal of error.

In the aforedescribed embodiments, it is necessary to depress the root key of the chord before an indication of the triad notes is activated. In some teaching techniques, it may be desirable to obtain an indication in advance of actual depression of the key. To accomplish this, the embodiment of FIGURE 2 utilizes touch plates or proximity sensors at each key, together with a system of electronic switches, a diode matrix and logic circuits comprising coincidence gates for activation of the indicators.

Figure 2:
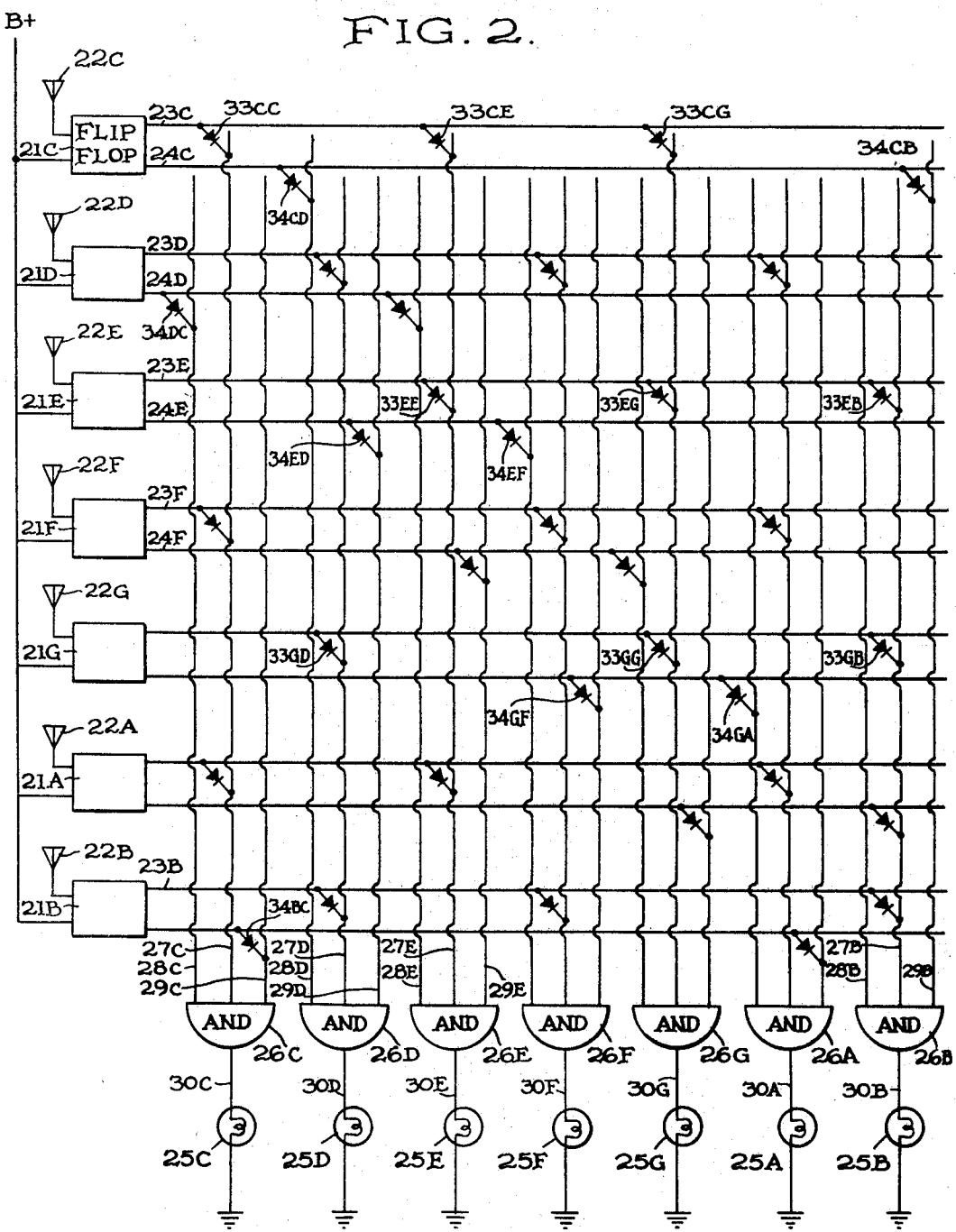
FIGURE 2 is a schematic diagram of another embodiment of the invention using touch-plate or proximity switch activation of the indicators.

Referring specifically to FIGURE 2, each key is provided with a touch or proximity sensor indicated diagrammatically at 22C–22B. Such devices are well known and are disclosed in such patents as 3,230,519 issued Jan. 18, 1966 to R. B. Metz, 3,257,658 issued June 21, 1966 to J. G. Lloyd, and 3,244,369, issued Apr. 5, 1966 to E. G. Nassimbene. The sensor may take the form of a capacitive plate applied to the playing surface of a conventional key in any suitable manner, such as by adhesive, may be built into the key module itself or may be mounted at a position closely adjacent to the key. Such sensors are sensitive to a disturbance of the normal dielectric properties of the air medium proximate to the sensor, and the sensitivity may be set to require an actual contact with the playing surface of a mere close proximity thereto. Each sensor has associated therewith a trigger circuit effective to couple a source of power alternatively to one of two output lines. Such trigger circuits are known as flip-flops and are indicated by reference numerals 21C–21B, the letter suffix again indicating the key with which each is associated. Each of the flip-flops is provided with a pair of outputs comprising an activate output 23 and an enabling output 24. During the standby mode of each circuit, i.e., when the sensor is not activated by the presence of a student's finger, the flip-flop 21 remains in a quiescent state in which a signal is present at the enabling output 24 and is absent at the activate output 23. Upon sensing of proximity or touch of a student's finger at the key, the flip-flop is triggered to a second stable state in which the enabling output signal is removed and the activate output 23 is energized. Removal of the student's finger results in a return of the flip-flop to the quiescent state.

As in the embodiment of FIGURE 2, the indicators are interconnected to the sensors by a diode matrix, the operation of which is identical to that of FIGURE 1 insofar as the activate output is concerned. Thus, proximity or touch of a finger at key C is sensed by sensor 22C which results in the triggering of flip-flop 21C and the establishment of a signal at activate output 23C. Through diodes 23CC, 33CE and 33CG indicator lines 27C, 27E, and 27G are energized.

In lieu of the mechanical inhibit switches of FIGURE 1, this embodiment utilizes logic circuits comprising a plurality of coincidence gates 26, one associated with each indicator 25. Each coincidence gate 26 functions to provide an output to its respective indicator 25 through gate output 30 only upon the coincident occurrence of a signal at all inputs 27, 28 and 29. Thus, when key C is activated, gate 26C is supplied with a signal over indicator line 27C as outlined in the preceding paragraph. It will be evident in referring further to FIGURE 2 that the enabling outputs 23D and 23B of keys D and B, neither of which is involved in the chord triad CGE, remain energized by virtue of the quiescent state of flip-flops 21D and 21B. Enabling outputs 23D and 23B in turn apply a signal through diodes 34DC and 34BC to the coincidence lines 28C and 29C. Thus, a signal is present at each of the three inputs to coincidence gate 26C causing it to provide an output at 30C to activate indicator 25C. Similarly, coincidence gates 26E and 26G are each provided with three input signals and are thus effective to provide outputs to activate indicators E and G.

In each instance of activation of a key of the triad, the associated flip-flop is triggered to an alternative stable state in which an output is removed from its enabling output line. Thus, activation of flip-flop 21C removes the enabling signal from enabling output 24C and coincidence line 20B, thus preventing an output by coincidence gate 26B despite the appearance of a signal at indicator line 27B when sensors E and G are activated in playing the triad CEG. In this manner, the enabling and coincidence lines and associated logic gates perform a function similar to the inhibit switches of FIGURE 1 while permitting the use of electronic switching throughout.

The teaching advantage of the proximity or touch sensing of the student's finger will be readily evident to even the casual observer. By this apparatus, a student may seek out the root note of a triad and have an indication of the companion notes of the triad presented to him in advance of actual depression of any key. Consequently, all keys may be depressed simultaneously to provide a harmonious chord with no lag in sounding any individual note of the chord. Even more significant than the effect on the resultant function of the instrument is the reaction of the student himself. By this teaching device the action of seeking out the root key, receiving an indication of the proper companion keys, and positioning the hand for depression of all keys of the triad can be accomplished before any positive manipulation of keys is commenced. It is this final manipulation of keys which subconsciously frightens a student, probably due to a feeling that he is thereby committed to his choice and any error will be evident and uncorrectable. By expediting the presentation of the indication to a point in time in advance of this final manipulative commitment, the student is encouraged to take action in positioning the fingers and is free of any attendant fear of error. The error signal described in connection with the embodiment of FIGURE 1, would also be presented in this embodiment, and would be evident prior to the manipulative step, thus permitting the student to correct an error before final commitment.

Those skilled in the use of teaching aids will immediately recognize the implications of such a device in teaching the use of keyboard devices other than musical instruments. Such devices as typewriters, punch card devices, calculators, computer read-ins, etc., involve keyboards wherein teaching of the requisite manual dexterity in the manipulation thereof can be enhanced by providing a student with a visual indication of action to be taken or of anticipated error in arvance of the actual manipulation of a key, while avoiding cumbersome rigging of attachments to the student's fingers as in such previously known devices as exemplified by U.S. Patent 3,234,664 issued Feb. 15, 1966 to B. W. Yaeger. In this respect, the basic combination of a touch or proximity sensor and a mechanically actuated key function can be utilized in numerous functional arrangements. The embodiments described herein are merely exemplary of such arrangements, and are not to be considered as the sole manner of use of this invention, the scope of which is to be determined by the following claims.

We claim:

1. A visual keyboard teaching device comprising:
  (A) at least one keyboard including keys,
  (B) indicator means visually associated with said keys,
  (C) a group of keys selected from said keys, said group having a predetermined relationship and including:
    (a) a selected individual key which characterizes said group, and
    (b) companion keys forming the remainder of said group,
  (D) switching means including
    (a) a first circuit network comprising means actuated by said selected individual key to activate the indicators associated with each of said group of keys, and
    (b) a second circuit network comprising at least one means actuated by said selected individual key to inhibit subsequent activation of indicators other than the indicators activated by said first network.

2. A visual keyboard teaching device as set forth in claim 1 wherein said first circuit network comprises a diode matrix.

3. A visual keyboard teaching device as set forth in claim 1 wherein each said circuit network comprises a diode matrix.

4. A visual keyboard teaching device set forth in claim 3 wherein said second network comprises an impedance connected in series with each said indicator means, and wherein said means of said second network is connected in shunt with the means of said first circuit network and said indicator means to a point intermediate of said indicator means and said impedance.

5. The visual keyboard teaching device as set forth in claim 1 wherein certain of said second circuit network means are interposed in circuits at least partially common to a plurality of said indicators.

6. The visual keyboard teaching device as set forth in claim 1, said device including further switching means actuated by certain of said companion keys and electrically associated with the said second network circuit means which interconnects said first-mentioned switching means with the indicator means visually associated with the same said certain key, said further switching means effective upon actuation by said certain key to defeat the inhibit mode operation of said second network circuit means on said last-mentioned indicator.

7. A visual chord teaching device for use in instruction in the playing of chord triads with a sustained note musical instrument, said device comprising the device set forth in claim 1 wherein each said key corresponds to a note in a musical scale and wherein said inhibited indicators comprise indicators visually associated with keys corresponding to the notes occurring in said scale on either side of the individual notes of said triad.

8. A visual chord keyboard teaching device for use in instruction in the playing of a chord triad with a sustained note musical instrument comprising the device set forth in claim 1 wherein said keyboard is a manual keyboard and said musical instrument includes a clavial keyboard, and wherein said indicator means include individual indicators associated with keys of each said keyboard, said group of keys including keys of said manual keyboard corresponding to the notes of said chord triad and a key of said clavial keyboard corresponding to the note of said selected key in the bass octave.

9. A visual keyboard teaching device as set forth in claim 1 wherein said switching means comprise electronic switches, said device further including a proximity sensor associated with each key, each said switching means being actuated by the sensor associated with its respective key.

10. A visual keyboard teaching device as set forth in claim 1, said device further including logic gating means interposed between said indicator means and both said circuit networks, each said logic gating means comprising a coincidence gate having a single output connected to one of said indicator means and a plurality of inputs, one of said inputs connected to said first circuit network and provided with a control signal by said actuation of said first circuit network means from a passive mode to an activate mode, the others of said inputs being connected to said second circuit network and deprived of a control signal by said actuation of said second circuit network means, each said coincidence gate providing an output to said one of said indicating means only when control signals are present at all said gate inputs.

References Cited

UNITED STATES PATENTS

| | | | |
|---|---|---|---|
| 2,820,391 | 1/1958 | Janssen | 84—478 |
| 3,335,630 | 8/1967 | Schmoyer | 84—478 |

RICHARD B. WILKINSON, Primary Examiner

LAWRENCE R. FRANKLIN, Assistant Examiner

U.S. Cl. X.R.

35—6